US008059961B2

(12) United States Patent
Shimoosako et al.

(10) Patent No.: US 8,059,961 B2
(45) Date of Patent: Nov. 15, 2011

(54) CUSTOMER PREMISES OPTICAL NETWORK UNIT AND OPTICAL TRANSMISSION SYSTEM

(75) Inventors: Kazutaka Shimoosako, Tokyo (JP); Kunio Odaka, Tokyo (JP); Katsuya Aboshi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 854 days.

(21) Appl. No.: 12/046,100

(22) Filed: Mar. 11, 2008

(65) Prior Publication Data
US 2009/0060509 A1 Mar. 5, 2009

Related U.S. Application Data

(63) Continuation of application No. PCT/JP2007/058504, filed on Apr. 19, 2007.

(30) Foreign Application Priority Data

Apr. 28, 2006 (JP) ................................. 2006-126700
Aug. 11, 2006 (JP) ................................. 2006-220440

(51) Int. Cl.
*H04J 14/00* (2006.01)
(52) U.S. Cl. ................ 398/66; 398/58; 398/63; 398/98; 398/100; 370/249; 370/463
(58) Field of Classification Search ............. 398/58–75, 398/98, 100; 370/249, 463
See application file for complete search history.

(56) References Cited

U.S. PATENT DOCUMENTS

| 2005/0207398 A1* | 9/2005 | Choi et al. ................ 370/352 |
| 2006/0053309 A1* | 3/2006 | Vereen et al. .............. 713/300 |
| 2007/0153823 A1* | 7/2007 | Wojtowicz ................. 370/463 |

FOREIGN PATENT DOCUMENTS

| JP | 2002-305529 | 10/2002 |
| JP | 2004-32541 | 1/2004 |

OTHER PUBLICATIONS

Wojtowicz: Provisional U.S. Appl. No. 60/755,894, Dec. 30, 2005.*

* cited by examiner

*Primary Examiner* — Li Liu
(74) *Attorney, Agent, or Firm* — Oblon, Spivak, McClelland, Maier & Neustadt, L.L.P.

(57) ABSTRACT

A customer premises optical network unit (ONU) comprises: an electrical/optical transform unit 6 to be connected with an optical transmission path 2 at a central office side for performing an opto-electrical transform and an inverse opto-electrical transform; an ONU function part 7 to be connected with an electric signal input and output terminal of the electrical/optical transform unit 6; a serial/parallel transform unit 8 to be connected with a parallel signal terminal of the ONU function part 7 for performing a serial/parallel transform and an inverse serial/parallel transform; and a multi source agreement interface module 9 to be connected with a serial signal terminal of the serial/parallel transform unit 8.

17 Claims, 7 Drawing Sheets

CUSTOMER PREMISES OPTICAL NETWORK UNIT AND OPTICAL TRANSMISSION SYSTEM

BACKGROUND OF THE INVENTION

1. Technical Field

The present invention relates to a customer premises optical network unit (ONU) and an optical transmission system. More specifically, it relates to the ONU comprising a multi source agreement (MSA) interface module or an original interface module connected with a terminal at the customer premises side, and to the optical transmission system comprising the ONU.

2. Background Art

Regarding an optical network, such as a fiber to the home (FTTH), a cable television (CATV), and the like, as reported in the below described patent document 1, an optical transmission system of passive optical network (PON) type is used, in which an optical transmission path to be connected with a central office is split by a passive splitter and then constructed for a plurality of customer premises. Such optical transmission system is called as a passive double star (PDS) as well.

Figure 8:
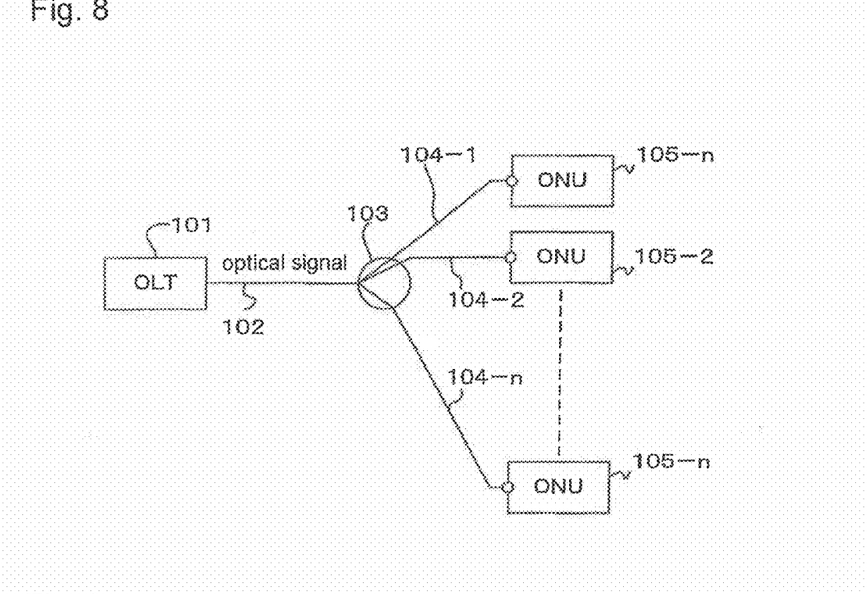
FIG. 8 is a configuration diagram showing a conventional optical transmission system.

Regarding such the optical transmission system, as shown in FIG. 8, for an optical fiber 102 for a user side extended from an optical line termination (OLT) 101 at the central office, a splitter 103 is connected therewith. Moreover, for a plurality of optical transmission path split by the splitter 103, via optical fibers 104-1 to 104-n, optical network units (ONU) 105-1 to 105-n in the customer premises are connected therewith.

Figure 9:
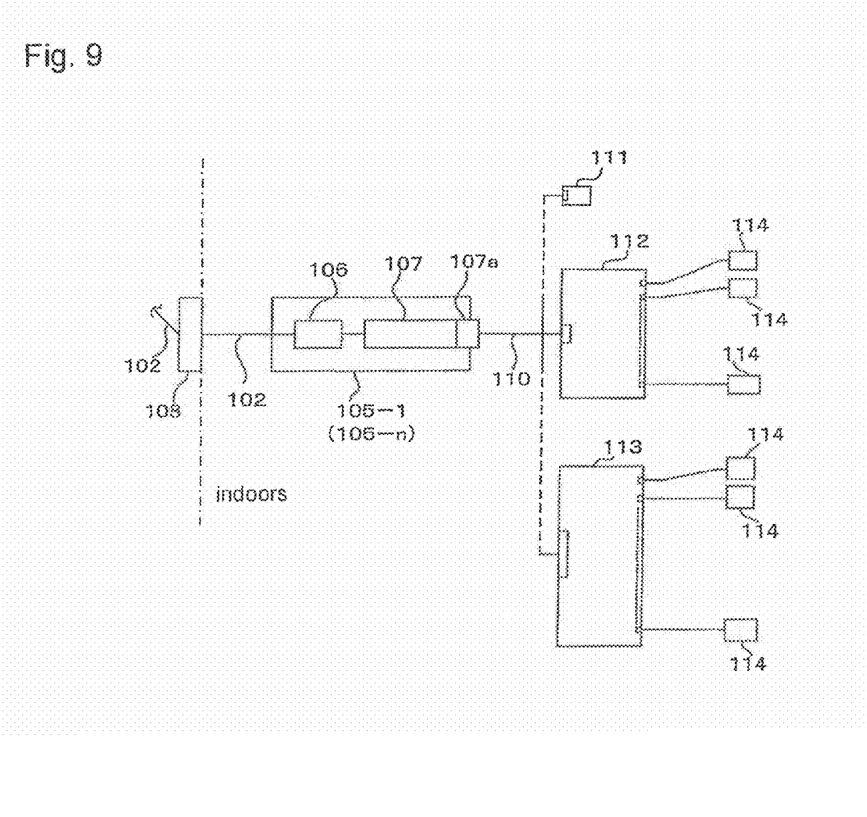
FIG. 9 is a configuration diagram showing a system in customer premise of the conventional optical transmission system.

Moreover, the ONU 105-1 to 105-n is, as shown in FIG. 9, comprised of an optical transceiver part 106 and an ONU function part 107, and then it is installed indoors. Furthermore, for the optical transceiver part 106, for example, the optical fiber 102 is connected therewith, which is led into the indoors from outdoor, via an optical splice unit 108.

Moreover, in the ONU function part 107, regarding an Ethernet (the registered trade name) interface 107a of such as 100/1000 BASE-TX, for example, a local area network (LAN) cable 110 is to be connected therewith. And then for the LAN cable 110, such as a computer 111, a router 112, a switching hub 113, and the like, are to be connected therewith. Furthermore, for the router 112 and the switching hub 113, a peripheral device 114, such as a computer, a printer, or the like, is to be connected therewith.

Moreover, the Ethernet interface 107a is comprised of a physical layer (PHY) to be connected with a media independent interface (MII) of a large scale integration (LSI) for ONU, and of a transfer and then a connector to be connected in order therewith.

[Patent Document 1] Japanese Patent Application Publication No. H09-214541

DISCLOSURE OF THE INVENTION

Problems to be Solved by the Invention

For connecting a plurality of peripheral devices 114 with the ONU 105-1 to 105-n, the router 112 or the switching hub 113 becomes to be necessary. And then between the optical splice unit 108 and the peripheral devices 114, there are a plurality of equipment devices and cables to be existed.

Hence, in the case of connecting a plurality of peripheral devices with an end terminal of the optical transmission path, the ONU is to be connected with the end terminal first. And then between the ONU and the router or the switching hub, a cable becomes to be necessary to connect therewith, as it is annoyed. Moreover, for arranging such the equipment devices and a power supply unit for the ONU, and for wiring the cables, a device arrangement space cannot help but be ensured as sufficiently wide. Furthermore, due to the power supply unit for ONU and the cables, a reliability of a whole hardware components cannot help but decreased. Thus, there are some problems to be occurred thereby.

An object of the present invention is to provide a customer premises optical network unit (ONU) and an optical transmission system, for easy connection between an optical transmission path and a plurality of peripheral devices, for a device arrangement space smaller than that of conventional, and for being able to improve the reliability of the hardware components by reducing such as the power supply unit for ONU, the cables, and the like.

Means for Solving the Problem

A first aspect of the present invention for solving the above mentioned problems is a customer premises optical network unit (ONU) comprising: an electrical/optical transform unit to be connected with an optical transmission path at a central office side for performing an opto-electrical transform and an inverse opto-electrical transform; an ONU function part to be connected with an electric signal input and output terminal of the above mentioned electrical/optical transform unit; a serial/parallel transform unit to be connected with a parallel signal terminal of the above mentioned ONU function part for performing a serial/parallel transform and an inverse serial/parallel transform; and a multi source agreement (MSA) interface module to be connected with a serial signal terminal of the above mentioned serial/parallel transform unit.

A second aspect of the present invention is the customer premises ONU according to the above mentioned first aspect, wherein the above mentioned MSA interface module is to be any one module of a giga bit interface converter (GBIC) and a small form factor pluggable (SFP).

A third aspect of the present invention is the customer premises ONU according to the above mentioned first or the second aspect, wherein the above mentioned parallel signal is to be comprised of 10 bits for both of an input signal and an output signal.

A fourth aspect of the present invention is the customer premises ONU of any one of the above mentioned first to the third aspects, wherein the above mentioned ONU function part comprises a signal terminal for outputting a received establishment signal to an external node to be connected with the above mentioned MSA interface module, triggered by a signal output when a passive optical network (PON) link with the above mentioned central office side is established, or when an authentication with the above mentioned central office side is established.

A fifth aspect of the present invention is the customer premises ONU of any one of the above mentioned first to the fourth aspects, wherein the above mentioned ONU function part comprises a signal terminal to output a control signal for establishing a communication state between the above mentioned serial/parallel transform unit and the above mentioned MSA interface module, to the above mentioned serial/parallel transform unit, triggered by a signal output when a PON link with the above mentioned central office side is established, or when an authentication with the above mentioned central office side is established.

A sixth aspect of the present invention is the customer premises ONU of the above mentioned fifth aspect, wherein the above mentioned serial/parallel transform unit comprises a loop back setting part, which forms a loop back state for looping back a signal from the above mentioned central office side at the period of an initial state before the above mentioned communication state being established, and which releases the above mentioned loop back state after the above mentioned communication state being established, triggered by the above mentioned control signal output from the above mentioned signal terminal of the above mentioned ONU function part.

A seventh aspect of the present invention is the customer premises ONU of any one of the above mentioned fourth to the sixth aspects, wherein the above mentioned signal terminal of the above mentioned ONU function part is to be connected with a time adjustment circuit.

A eighth aspect of the present invention is an optical transmission system comprising: the customer premises ONU according to any one of the above mentioned first to the seventh aspects; an optical multiplexing and de-multiplexing part comprises a customer premises port to be connected with the above mentioned customer premises ONU via a first optical transmission path; a second optical transmission path to be connected with a central office side port of the above mentioned optical multiplexing and de-multiplexing part; and an OLT (Optical Line Terminal) at the above mentioned central office side to be connected with the above mentioned second optical transmission path.

A ninth aspect of the present invention is the optical transmission system of the above mentioned eighth aspect, wherein the above mentioned MSA interface module of the above mentioned customer premises ONU is to be connected directly with an MSA interface slot of a node arranged externally therefrom.

A tenth aspect of the present invention is the optical transmission system of the above mentioned ninth aspect, wherein the above mentioned node is to be a LAN (Local Area Network) switch comprising a plurality of ports.

A eleventh aspect of the present invention is a customer premises optical network unit (ONU) comprising: an electrical/optical transform unit to be connected with an optical transmission path at a central office side for performing an opto-electrical transform and an inverse opto-electrical transform; an ONU function part to be connected with an electric signal input and output terminal of the above mentioned electrical/optical transform unit; a serial/parallel transform unit to be connected with a parallel signal terminal of the above mentioned ONU function part for performing a serial/parallel transform and an inverse serial/parallel transform; an interface module to be connected with a serial signal terminal of the above mentioned serial/parallel transform unit; and the above mentioned ONU function part further comprising: a signal terminal for outputting a received establishment signal to an external node to be connected with the above mentioned interface module, triggered by a signal output when a passive optical network (PON) link with the above mentioned central office side is established, or when an authentication with the above mentioned central office side is established.

A twelfth aspect of the present invention is the customer premises ONU according to the above mentioned eleventh aspect, wherein the above mentioned ONU function part comprises a signal terminal to output a control signal for establishing a communication state between the above mentioned serial/parallel transform unit and the above mentioned interface module, to the above mentioned serial/parallel transform unit, triggered by a signal output when a PON link with the above mentioned central office side is established, or when an authentication with the above mentioned central office side is established.

A thirteenth aspect of the present invention is the customer premises ONU according to the above mentioned eleventh or the twelfth aspect, wherein the above mentioned parallel signal is to be comprised of 10 bits for both of an input signal and an output signal.

A fourteenth aspect of the present invention is the customer premises ONU according to the above mentioned twelfth aspect, wherein the above mentioned serial/parallel transform unit comprises a loop back setting part, which forms a loop back state for looping back a signal from the above mentioned central office side at the period of an initial state before the above mentioned communication state being established, and which releases the above mentioned loop back state after the above mentioned communication state being established, triggered by the above mentioned control signal output from the above mentioned signal terminal of the above mentioned ONU function part.

A fifteenth aspect of the present invention is the customer premises ONU according to any one of the above mentioned eleventh to the fourteenth aspects, wherein the above mentioned signal terminal of the above mentioned ONU function part is to be connected with a time adjustment circuit.

A sixteenth aspect of the present invention is an optical transmission system comprising: the customer premises optical network unit (ONU) according to any one of the above mentioned eleventh to the fifteenth aspect; an optical multiplexing and de-multiplexing part comprises a customer premises port to be connected with the above mentioned customer premises ONU via a first optical transmission path; a second optical transmission path to be connected with a central office side port of the above mentioned optical multiplexing and de-multiplexing part; and an OLT (Optical Line Terminal) at the above mentioned central office side to be connected with the above mentioned second optical transmission path.

A seventeenth aspect of the present invention is the optical transmission system of the above mentioned sixteenth aspect, wherein the above mentioned interface module of the above mentioned customer premises ONU is to be connected directly with an interface slot of a node arranged externally therefrom.

A eighteenth aspect of the present invention is the optical transmission system of the above mentioned seventeenth aspect, wherein the above mentioned node is to be a LAN (Local Area Network) switch comprising a plurality of ports.

EFFECTS OF THE INVENTION a customer premises optical network unit (ONU) regarding the present invention is comprised of: an electrical/optical transform unit to be connected with an optical transmission path at a central office side; an ONU function part to be connected with an electric signal input and output terminal of the above mentioned electrical/optical transform unit; a serial/parallel transform unit to be connected with a parallel signal terminal of the above mentioned ONU function part; and a multi source agreement (MSA) interface module to be connected with a serial signal terminal of the above mentioned serial/parallel transform unit.

Regarding the MSA interface module, there are modules of such as a giga bit interface converter (GBIC), a small form factor pluggable (SFP), and the like. Moreover, such the module is inserted into a slot for such as the GBIC, SFP, or the like, at a node of such as a Ethernet switch. And then without wiring cables, direct connection between the customer premises ONU and the node becomes possible. Moreover, the customer premises ONU becomes possible to be comprised simply, and then it is sufficient with a small installation space. Furthermore, such a power supply adaptor and LAN cables for the customer premises ONU becomes unnecessary. And then the reliability of the hardware components becomes able to be improved.

Moreover, regarding the customer premises ONU, with any one of a PON link establishment signal or an ONU authentication establishment signal, the communication state mutually between the customer premises and the central office becomes to be established. Therefore, for example, eliminating error processes becomes possible, from such as a case that a communication error happen to be occurred due to sending rashly a signal to the customer premises ONU from the Ethernet switch side inserted before establishing the PON link or the authentication of the ONU.

BRIEF DESCRIPTION OF THE REFERENCE SYMBOLS

1: OLT
2, 4: OPTICAL TRANSMISSION PATH (OPTICAL FIBER)
3: OPTICAL COUPLER
4-1 to 4-n: OPTICAL FIBER
5: MSA ONU
5-1 to 5-n: ONU
6: ELECTRICAL/OPTICAL TRANSFORM UNIT (OPTICAL TRANSCEIVER)
7: ONU FUNCTION PART
8: SERIAL/PARALLEL TRANSFORM UNIT
9: MSA INTERFACE MODULE
10: LSI FOR ONU
10$k$: TBI TERMINAL
10$m$: GPIO TERMINAL
20: NODE
20$a$, 21: MSA INTERFACE SLOT
30: GPIO SIGNAL
31$a$: PON LINK ESTABLISHMENT SIGNAL
31$b$: RX-LOSS SIGNAL
32: CONTROL SIGNAL

BEST MODE FOR CARRYING OUT THE INVENTION

An embodiment of the present invention will be described in detail below, based on the drawings.

Figure 1:
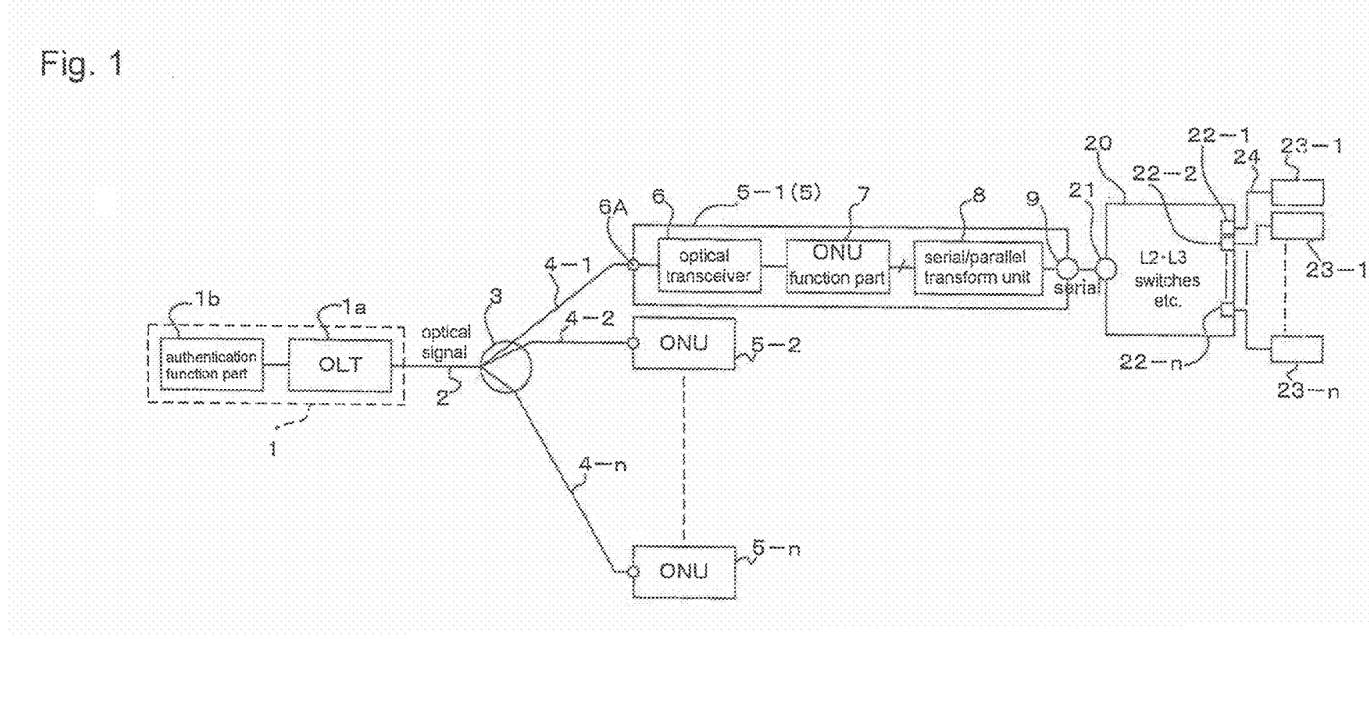
FIG. 1 is a configuration diagram of an optical transmission system regarding an embodiment of the present invention.

FIG. 1 is a configuration diagram of a PON type optical transmission system regarding an embodiment of the present invention.

Regarding the PON type optical transmission system shown in FIG. 1, a PON interface card 1 provided at a central office comprises an optical line termination (OLT) 1$a$ and an authentication function part 1$b$. Moreover, for an optical input and output terminal of the OLT 1$a$, one end of an optical fiber 2 as an optical transmission path is connected therewith. Furthermore, for another end of the optical fiber 2, that is to say, for customer premises side, an optical coupler (optical multiplexing and de-multiplexing part) 3 is connected therewith.

Moreover, the optical transmission path is branched into plural number by the optical coupler 3. And then each branch is connected with a plurality of optical network units (ONU) 5-1 to 5-n(n: natural numbers) in the customer premises, via optical fibers 4-1 to 4-$n$ respectively.

Regarding the OLT 1$a$ at the central office, at the time of connecting with the ONU 5-1 to 5-n, a signal is exchanged with the ONU 5-1 to 5-n for determining a predetermined condition being satisfied or not. And then if it is satisfactory, an establishment of a data link is to be determined as normal. Hereby, between the OLT 1$a$ and the ONU 5-1 to 5-n, a PON link becomes to be an established state.

Regarding the establishment of the PON link, such as in a reference model of an open systems interconnection (OSI), it corresponds to the link establishment on the second layer. For example, in the case of a gigabit Ethernet PON (GE-PON) for a system of the OLT 1$a$ and the ONU 5-1 to 5-n, the establishment of the PON link is to be pursuant to a procedure of the IEEE 802.3ah standard.

Moreover, the authentication function part 1$b$ has an authentication function, and perform the authentication, after the OLT 1$a$ and the ONU 5-1 to 5-n becoming the established state therebetween, for identifying a connected party for the ONU 5-1 to 5-n respectively, by accessing to the ONU 5-1 to 5-n, and then by obtaining a data of an authentication mode therein. Moreover, for the authentication mode, there are such as a media access control (MAC) address authentication mode, automatic authentication mode, and the like.

Regarding the MAC address authentication mode, an individual MAC address set at each ONU 5-1 to 5-n is to be as a base for performing a management therefor. And then by pre-registering each MAC address of the ONU 5-1 to 5-n into the authentication function part 1$b$, the ONU 5-1 to 5-n become able to be identified. Moreover, regarding the automatic authentication mode, all of connected logical link are authenticated, and a communication of a main signal is permitted, as the mode. Therefore, an extra work of such as a MAC address registration of the ONU 5-1 to 5-n , or the like, is not necessary. And then for example, using values of ONU numbering LAN (Local Area Network) switches installed into the ONU 5-1 to 5-n respectively, it is possible to be managed.

Regarding the OLT 1a and the ONU 5-1 to 5-n, a device is to be used, which suits regulations of a gigabit passive optical network (G-PON; a method to be pursuant to the ITU standard G.984.x) and a gigabit Ethernet PON (GE-PON; a method to be pursuant to the IEEE 802.3ah standard).

Figure 2:
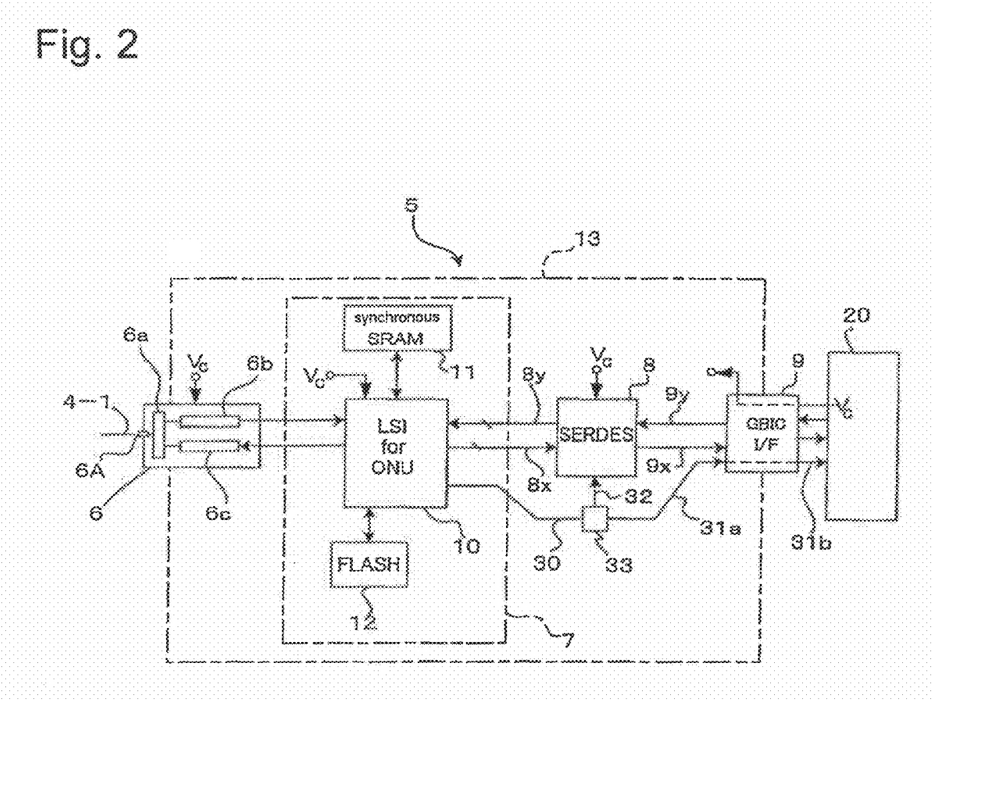
FIG. 2 is a block diagram showing a configuration of an MSA ONU 5 used for the optical transmission system regarding the embodiment of the present invention.

For at least one of the ONU 5-1 to 5-n, a multi source agreement (MSA) ONU 5 is adopted. Moreover, the MSA ONU 5 is, as shown in FIG. 1 and FIG. 2, comprised of an optical transceiver 6 as an electrical/optical transform unit, an ONU function part 7, a serial/parallel transform unit 8 or a serializer/deserializer (SERDES), an MSA interface module, and a package 13 for storing those.

Regarding the MSA interface module 9, which is connected with the serial/parallel transform unit 8 in the MSA ONU 5, it corresponds to a standard for direct connection possible with an MSA interface slot 21 provided at an external node 20, such as an L2 switch, an L3 switch, a router, and the like. Moreover, for the MSA interface module 9, there is a module, such as a giga bit interface converter (GBIC), a small form factor pluggable (SFP), or the like. Regarding the GBIC module, it is the module to be connected with network devices (L2 and L3 switches) corresponding to the GE. Moreover, it is the dismountable module to be possible for transmission of a fiber channel and a GE-PHY. Furthermore, the SFP is the module having a outward form smaller than that of the GBIC.

Moreover, the L2 switch is a network relay device which is to be the node 20, and based on a data of a data link layer (the second layer) of the OSI reference model, a destination of a packet is determined, and then a data transfer is performed thereby. Furthermore, the L3 is the network relay device, which based on a data of a network layer (the third layer) of the OSI reference model, a destination of a packet is determined, and then a data transfer is performed thereby.

Regarding a plurality of ports 22-1 to 22-n, which is provided at the node 20 which the MSA interface module 9 is connected therewith, peripheral devices 23-1 to 23-n, such as a personal computer and the like, are connected therewith, using cables 24.

Regarding the MSA ONU 5, to be more specific, it has a configuration as shown in FIG. 2 for example. In FIG. 2, the optical transceiver 6 comprises an optical multiplexing and de-multiplexing part 6a to be connected with an optical fiber 4-1 at the OLT 1 side, an opto-electrical transform circuit part 6b having a photo receiving element (not shown) to be optically coupled with a first optical transmission path branched by the optical multiplexing and de-multiplexing part 6a, and an inverse opto-electrical transform circuit part 6c having the light emission element (not shown) to be optically coupled with a second optical transmission path branched by the optical multiplexing and de-multiplexing part 6a.

Moreover, the ONU function part 7 is an electric circuit, which comprises a large scale integration (LSI) device 10 for PON processing to be connected with the optical transceiver 6, and a synchronous static random access memory (SRAN) 11 and a flash memory 12 connected with the LSI device 10. Moreover, for the flash memory 12, a program is written therein. Here, the MAC address is written in the flash memory 12 or a read only memory (ROM; not shown). Furthermore, the ONU function part 7 comprises an ONU numbering switch (not shown) to be connected with the LSI device 10.

Figure 3:
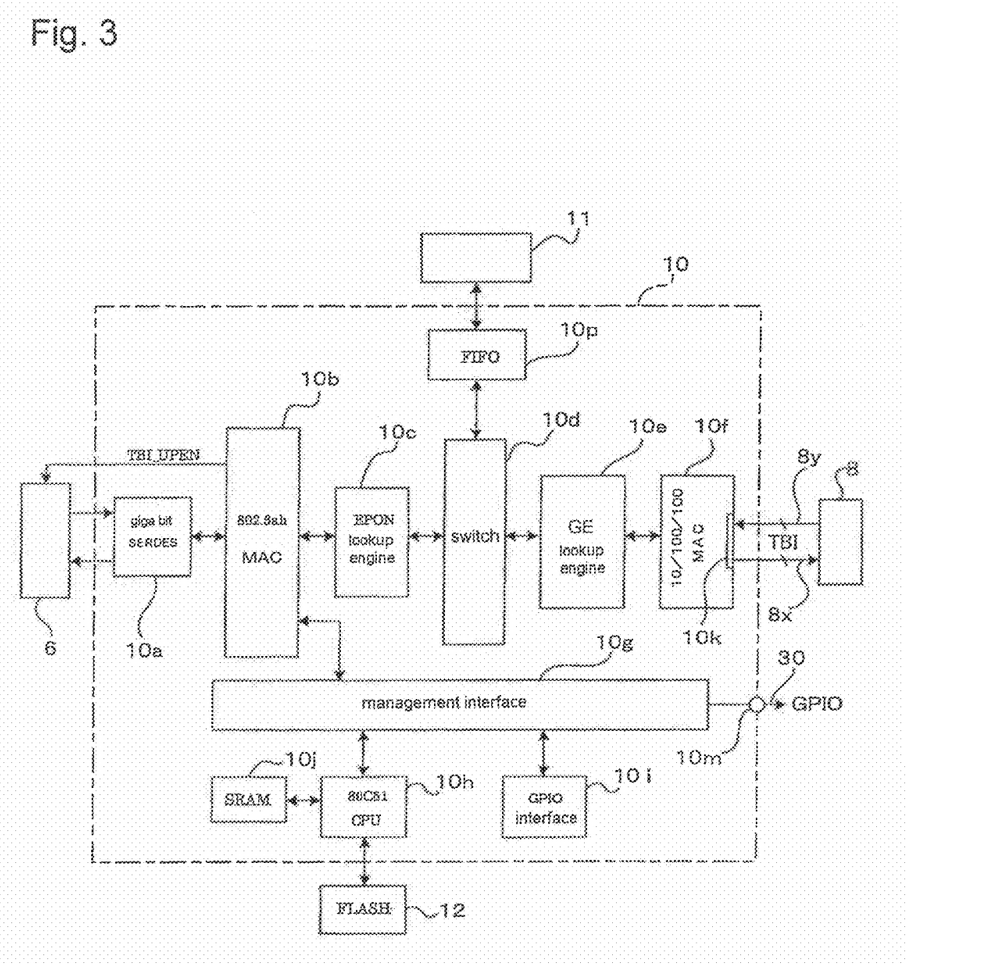
FIG. 3 is a block diagram showing a configuration of an LSI inside the MSA ONU used for the optical transmission system regarding the embodiment of the present invention.

Moreover, as shown in FIG. 3, the LSI device 10 comprises an MAC unit lob which is to be pursuant to the IEEE 802.3ah, and to be connected with an electric signal terminal of the optical transceiver 6 via a giga bit SERDES 10a. Moreover, the MAC unit 10b is, via an Ethernet PON (E-PON) lookup engine 10c, a switch 10d, and then a GE lookup engine 10e, connected with a 10/100/1000 MAC interface 10f. Furthermore, for the switch 10d in the LSI device 10, a first-in first-out (FIFO) 10p is connected therewith, for being connected with the above mentioned synchronous SRAM 11 as well.

Moreover, the MAC unit lob is, via a management interface log, connected with a CPU 10h of 80C51 family and a general purpose input/output (GPIO) interface 10i. Furthermore, for the CPU 10h, an SRAM 10j and the above mentioned flash memory 12 are connected.

Regarding the management interface log, via the MAC unit lob, the SERDES 10a, and then the optical transceiver 6, with the OLT 1a, procedured processes for the PON link establishment are performed. That is to say, a GPIO signal is output therefrom, which is to be a signal (1) signal before the PON link being established, and then to be a signal (0) after the PON link being established.

Regarding a GPIO terminal 10m in the LSI device 10, for outputting the GPIO signal 30, it is to be connected with one of terminals at the MSA interface module 9. And then it is used as a function for transmitting a link state between the MSA ONU 5 and the OLT 1a to the node 20.

That is to say, regarding the GPIO terminal 10m, via the MSA interface module 9, the GPIO signal 30 is transmitted to the node 20, as a receive loss (RX-LOSS) signal 31b. Moreover, regarding the GPIO signal 30 output from the GPIO terminal 10m, at the period of the PON link not being established, the signal (1) is output. And then at the time of the PON link being established, the signal (0) meaning a PON link establishment signal 31a is output to a terminal of the MSA interface module 9. Thus, the link state, which becomes established between the OLT 1a and the ONU function part 7, is transmitted to the node 20.

Moreover, the GPIO terminal 10m of the management interface log is connected with the serial/parallel transform unit 8 as well. And then the GPIO signal 30 is output, as a control signal 32, to the serial/parallel transform unit 8. That is to say, the control signal 32, which is output from the GPIO terminal 10m, controls the serial/parallel transform unit 8. And then it is used as a function for establishing a communication state between the LSI device 10 and the node 20.

Regarding the LSI device 10, at the time of the PON link being established, from the GPIO terminal 10m, the control signal 32 as (0) is output to the serial/parallel transform unit 8. Moreover, regarding the serial/parallel transform unit 8 which the signal (0) is input thereinto, a signal transmission mutual between the LSI device 10 and the MSA interface module 9 becomes to be possible.

For the GPIO terminal 10m of the LSI device 10, a branching unit 33 is connected therewith, which transmits GPIO signal 30 to both of the serial/parallel transform unit 8 (SERDES) and the MSA interface module 9. Moreover, regarding the branching unit 33, a time adjustment circuit function may be provided as well, which adjusts an arrival time of the GPIO signal 30 at the serial/parallel transform unit 8, and adjusts the arrival time of the GPIO signal 30 at the MSA interface module 9.

Moreover, the 10/100/1000 MAC interface 10f in the LSI device 10 has a MAC function of 100 Mbps and 1 Gbps Ethernet. Furthermore, the 10/100/1000 MAC interface 10f is a parallel interface comprising a 10 bit interface (TBI) terminal 10k. And then the TBI terminal 10k is to be connected, via an output wire 8x of 10 lines and an input wire 8y of 10 lines, with the serial/parallel transform unit 8.

Furthermore, the serial/parallel transform unit 8 (SERDES) is connected, via the serial output wire 9x and the serial input wire 9y, with the MSA interface module 9.

For such the LSI device 10 comprising the above mentioned structure, there is a chip which is pursuant to an E-PON from Teknovus Inc.

Figure 4:
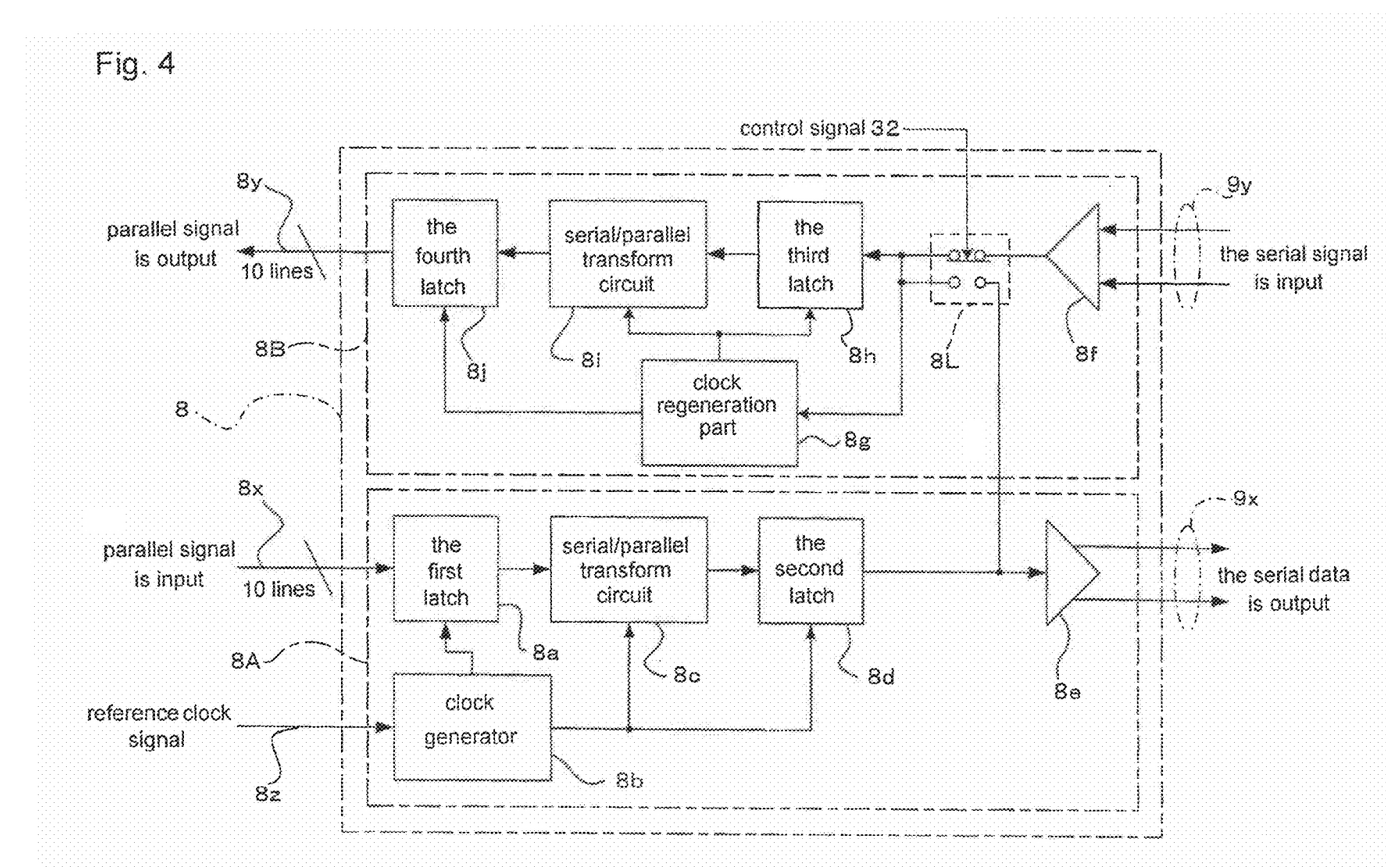
FIG. 4 is a block diagram showing a configuration of a serial/parallel transform unit inside the MSA ONU used for the optical transmission system regarding the embodiment of the present invention.

Regarding the serial/parallel transform unit 8 (SERDES) to be connected with the TBI terminal 10k in the LSI 10, shown as an example in FIG. 4, it comprises an inverse serial/parallel transform part 8A for transforming a parallel signal into a serial signal, a serial/parallel transform part 8B for transforming a serial signal into a parallel signal, and a loop back setting part 8L.

Moreover, the inverse serial/parallel transform part 8A comprises: a first latch 8a for holding temporarily a parallel signal input from the TBI terminal 10k in the LSI device 10; a first serial/parallel transform circuit 8c, which the parallel signal held by the first latch 8a is synchronized with a reference clock signal from the clock generator 8b thereby, and which the parallel signal is transformed into a serial signal and then output thereby; a second latch 8d for holding temporally the serial signal output from the first serial/parallel transform circuit 8c; and a branching part 8e, wherein the serial signal, which is synchronized with the reference clock and output from the second latch 8d, is branched into two parts thereby, and then is output to the MSA interface module 9 therefrom.

Moreover, the serial/parallel transform part 8B comprises: a multiplexing part 8f which a serial signal output from the MSA interface module 9 is input thereinto; a clock regeneration part 8g for regenerating a clock based on an output signal from the multiplexing part 8f; a third latch 8h for holding temporally a serial signal output from the multiplexing part 8f, which the serial signal is synchronized with the clock signal from the clock regeneration part 8g therein, and then the serial signal is output therefrom; a second serial/parallel transform circuit 8i for transforming the serial signal output from the third latch 8h into a parallel signal, synchronizing with the clock; and a fourth latch 8j, wherein the parallel signal output from the second serial/parallel transform circuit 8i is held temporally, the parallel signal is synchronized with the clock signal from the clock regeneration part 8g, and then the parallel signal is output to the TBI terminal 10k in the LSI device 10.

Furthermore, the loop back setting part 8L comprises a configuration that: at the period of the GPIO signal 30 from the LSI device 10 being (1) as an initial state, in the serial/parallel transform part 8B, the signal transmission from the multiplexing part 8f to the third latch 8h is interrupted; an output terminal of the second latch 8d in the inverse serial/parallel transform part 8A and an input terminal of the third latch 8h in the serial/parallel transform part 8B is connected to be a loop back state; at the time of the GPIO signal 30 becoming (0), the signal transmission from the multiplexing part 8f to the third latch 8h becomes possible, and then the connection between the second latch 8d and the third latch 8h becomes disconnected, and the loop back state becomes released.

Figure 5:
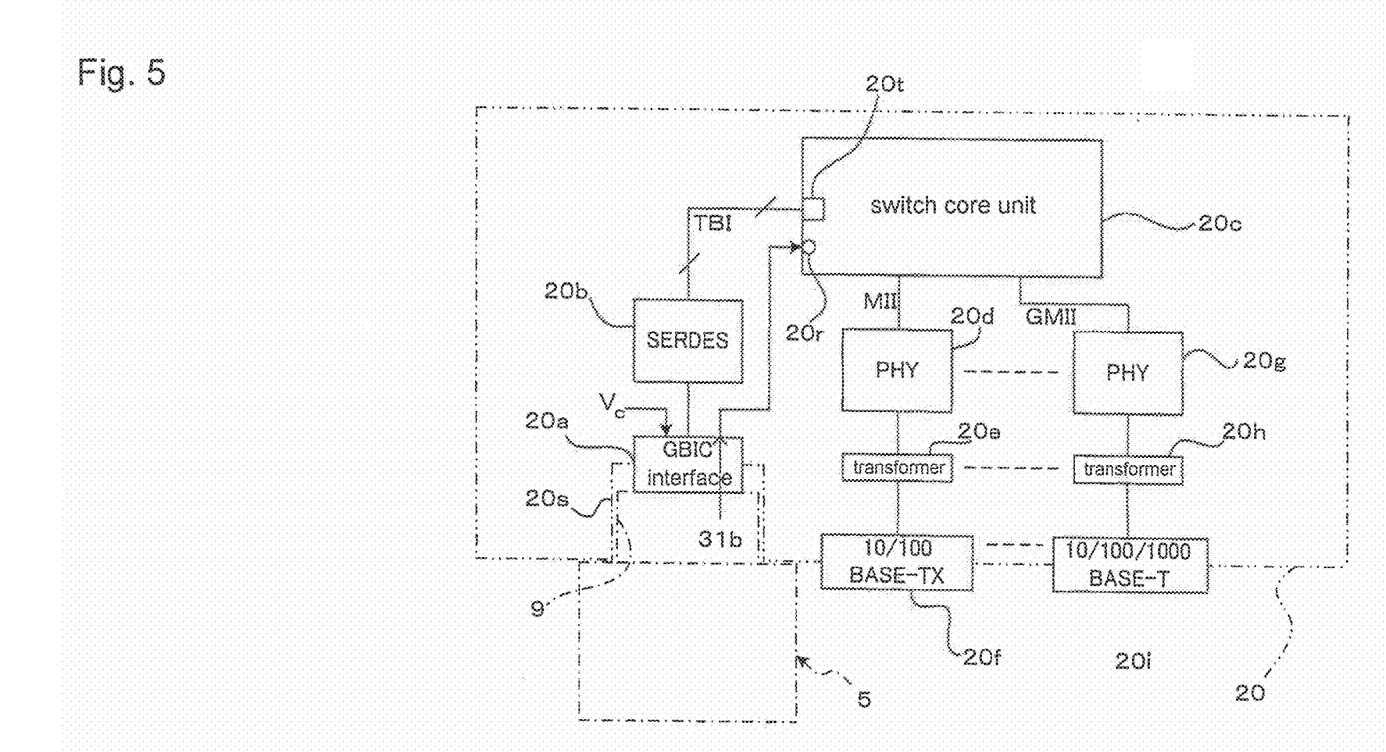
FIG. 5 is a block diagram showing one example of a node to be connected with the MSA ONU used for the optical transmission system regarding the embodiment of the present invention.

For the node 20 comprising a slot 20s which the MSA interface module 9 is to be inserted, there is for example an L3 Ethernet switch comprising a configuration as shown in FIG. 5.

Regarding an MSA interface slot 20a in the L3 Ethernet switch, GBIC interface slot is for example, via the serial/parallel transform unit 20b (SERDES), to be connected with a TBI terminal 20t on a switch core unit 20c. Moreover, on the switch core unit 20c, there is provided a terminal 20r to be connected for the RX-LOSS signal. Furthermore, the switch core unit 20c is to be comprised of IC devices.

Moreover, for a media independent interface (MII) on an MAC layer in the switch core unit 20c, PHY 20d, a transformer 20e, and a connector 20f pursuant to the 10/100 BASE-TX standard are connected therewith. Furthermore, for a gigabit MII (G-MII) on the MAC layer in the switch core unit 20c, PHY 20g, a transformer 20h, and a connector 20i pursuant to the 10/100/1000 BASE-T standard are connected therewith. And then for the connector 20f and 20i, LAN cables are to be connected therewith.

Moreover, the MSA interface slot 20a comprises a pin (not shown) outputting a voltage (Vc) applied by a power supply unit (not shown) in the node 20. Furthermore, via the pin, the power is supplied into the MSA ONU 5.

Regarding the above mentioned optical transmission system, with the optical fiber 2 connected with the OLT 1a at the central office side is also connected via the coupler 3 with the optical fiber 4-1 in the customer premises, first, as shown in FIG. 1, the optical fiber 4-1 is to be connected with an optical connector 6A on the optical transceiver 6 in the MSA ONU 5. Moreover, as shown in FIG. 5, the MSA interface module 9 of the MSA ONU 5 is inserted into the slot 20s on the node 20, and then it becomes connected with the MSA interface slot 20a.

Thus, from the MSA interface slot 20a to the MSA interface module 9, the power with the voltage (Vc) is supplied, and then the MSA ONU 5 becomes to be a driving state as an initial state.

During the initial state, the GPIO signal 30 output from the management interface log becomes (1), which is in the LSI device 10 for ONU of the MSA ONU 5. Moreover, regarding the loop back setting part 8L in the serial/parallel transform unit 8, the connection between the third latch 8h and the serial input wire 9y is to be disconnected therein. Furthermore, in the serial/parallel transform unit 8, the second latch 8d and the third latch 8h become to be connected as the loop back state.

Moreover, from the MSA interface module 9 to the MSA interface slot 20a, the GPIO signal 30 is output as the RX-LOSS signal 31b. And then at the period of the RX-LOSS signal 31b being (1) state, from the MSA interface slot 20a in the node 20 to the LSI device 10 in the MSA ONU 7, there becomes no signal transmitted as a state.

Figure 6:
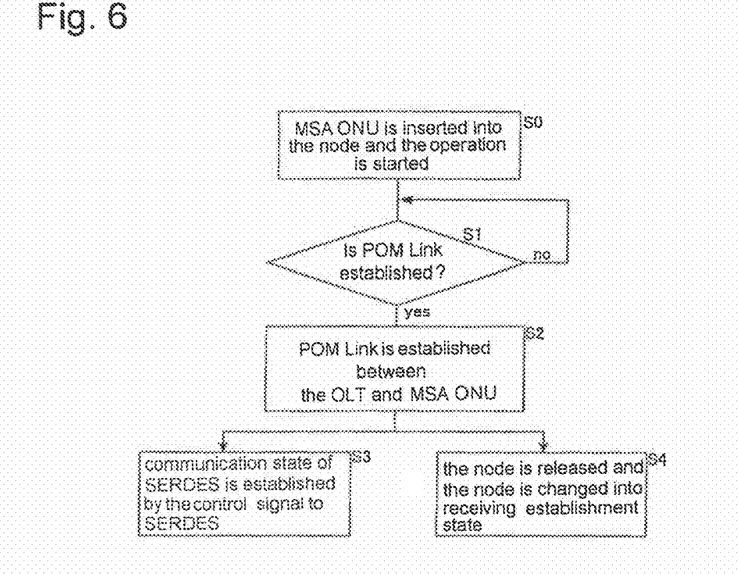
FIG. 6 is a flow diagram showing a communication state on the ONU for establishing a PON link with a central office in the optical transmission system regarding the embodiment of the present invention.

Here, when the MSA interface module 9 of the MSA ONU 5, which is optically connected with the OLT 1a, is inserted into the node 20, an operation of the MSA ONU 5 is started (an S0 in FIG. 6). And then between the OLT 1a and the MSA ONU 5, a communication for processing the PON link establishment becomes to be started.

Meanwhile, the loop back setting part 8L in the serial/parallel transform unit 8 is to be the loop back state at the period of the initial state. Therefore, even if the signal 9y is input from the node 20 side, by deleting at the serial/parallel transform unit 8 during the loop back state thereof, the rashly establishment of the link with the LSI device 10 side is able to be avoided. And then between the OLT 1a and the MSA ONU 5, after proper processes, the PON link is established (an S1 and an S2 in FIG. 6).

Regarding the LSI device 10 as the PON link being established, to the loop back setting part 8L in the serial/parallel transform unit 8 (SERDES), the GPIO signal 30 of (0) (the control signal 32) is output, and then the loop back state is released. Moreover, in the serial/parallel transform unit 8 (SERDES), a communication state between the MSA interface module 9 and the LSI device 10 becomes to be established (an S3 in FIG. 6).

Furthermore, regarding the LSI device 10 as the PON link being established, the RX-LOSS signal 31*b* of (0) meaning a normal state is transmitted to the node 20, via the MSA interface module 9 and the MSA interface slot 20*a*. Hence, a notice of a loss state for the node 20 is released, and then the node 20 is changed into a receiving establishment state (an S4 in FIG. 6).

Thus, via the MSA ONU 5, between the OLT 1*a* and the node 20, the data, such as the PHY, L1, L2, or the like, becomes to be transmitted as a state.

During the state of the communication being possible between the OLT 1*a* and the node 20, an optical signal propagated from the OLT 1*a* through the optical fiber 2 is branched by the optical coupler 3. Moreover, the signal is input into a plurality of the ONU 5-1 to 5-*n*, via the optical fiber 4-1 to 4-*n*.

Moreover, in the MSA ONU 5 comprised of at least one of the ONU 5-1 to 5-*n*, the optical signal is input into the opto-electrical transform part 6*b* via the optical multiplexing and de-multiplexing part 6*a* in the optical transceiver 6. Furthermore, it is transformed into an electric signal therein, and then it is input into the LSI device 10 in the ONU function part 7.

Moreover, in the LSI device 10, the serial signal as the electric signal is transformed into a parallel signal by a giga bit SERDES 10*a*. Furthermore, after predetermined various functional processes in the LSI device 10 therefor, the parallel signal is output from the TBI terminal 10*k*. Moreover, the parallel signal is further transformed into a serial signal by the serial/parallel transform unit 8, and then it is output to the MSA interface module 9.

Furthermore, the serial signal output from the MSA interface module 9 is, via the MSA interface slot 20*a* and the serial/parallel transform unit 20*b* (SERDES), input into the TBI terminal 20*t* on the switch core unit 20*c*. In this case, regarding the switch core unit 20*c*, based on the input signal, an address is determined thereof. And then a signal is transmitted to connectors 22-1 to 22-*n* corresponding to the address. Moreover, for computers 23-1 to 23-*n* connected via cables 24 with the connectors 22-1 to 22-*n* corresponding to the address, a signal is transmitted from the switch core unit 20*c* thereinto.

Meanwhile, a signal output from the computers 23-1 to 23-*n* is input into the switch core unit 20*c*, via the connectors 22-1 to 22-*n*. Moreover, a signal to be output for an optical network is output from the TBI terminal 20*t* on the switch core unit 20*c* to the serial/parallel transform unit 20*b* (SERDES). And then it is transmitted to a serial signal therein.

Moreover, the serial signal output from the serial/parallel transform unit 20*b* is, via the MSA interface slot 20*a*, input into the MSA interface module 9 in the MSA ONU 5. Furthermore, in the serial/parallel transform unit 8, it is transformed into a parallel signal, and then it is output to the TBI terminal 10*k* on the LSI device 10 in the ONU function part 7.

Furthermore, in the ONU function part 7, predetermined processes are performed on the parallel signal input into the TBI terminal 10*k*. Moreover, it is transformed into a serial signal at the serial/parallel transform unit 10*a* (giga bit SERDES) in the LSI device 10. And then the serial signal is output to the inverse opto-electrical transform part 6*c* in the optical transceiver 6. Furthermore, in the inverse opto-electrical transform part 6*c*, the serial signal transmitted from the ONU function part 7 is transformed into an optical signal. And then the optical signal is output to the optical fiber 4-1, via the optical multiplexing and de-multiplexing part 6*a*.

Moreover, the optical signal output from the MSA ONU 5 is transmitted to the OLT 1*a*, via the optical fiber 4-1, the optical coupler 3, and the optical fiber 2.

Thus, the PON link becomes established between the OLT 1*a* and the MSA ONU 5, and then the PON link establishment signals are obtained thereby. Moreover, one of the PON link establishment signals is output as the PON link establishment signal 31*a* in the MSA ONU 5 to the MSA interface module 9. Furthermore, it is output as the RX-LOSS signal 31*b* from the MSA interface module 9 to the node 20. Therefore, the establishment of the link between the OLT 1*a* and the MSA ONU 5 becomes able to be transmitted to the node 20.

Moreover, another PON link establishment signal is output as the loop back signal 32 to the serial/parallel transform unit 8. Hence, at the period of the PON link between the OLT 1*a* and the MSA ONU 5 not be established, a signal from the LSI device 10 to the serial/parallel transform unit 8 is to be the loop back state, and a communication state between the serial/parallel transform unit 8 and the node 20 is disconnected. And then at the time of the PON link between the OLT 1*a* and the MSA ONU 5 being established, the loop back state is released, and the signal becomes transmitted normally between the serial/parallel transform unit 8 and the node 20. Thus, the PON link state between the OLT 1*a* and the MSA ONU 5, and a state of the MSA interface module 9 becomes able to be synchronized therebetween.

Meanwhile, in the MSA ONU 5, regarding the GPIO signal 30 output from the LSI device 10, instead of basing on the establishment of the PON link, based on a signal of an authentication establishment meaning that the connected party for the ONU 5-1 to 5-*n* is identified at the authentication function part 1*b* in the PON interface card 1, it may be controlled as well. That is to say, even in the case of the PON link being established, in the LSI device 10, the GPIO signal 30 is not to be changed into (0).

Figure 7:
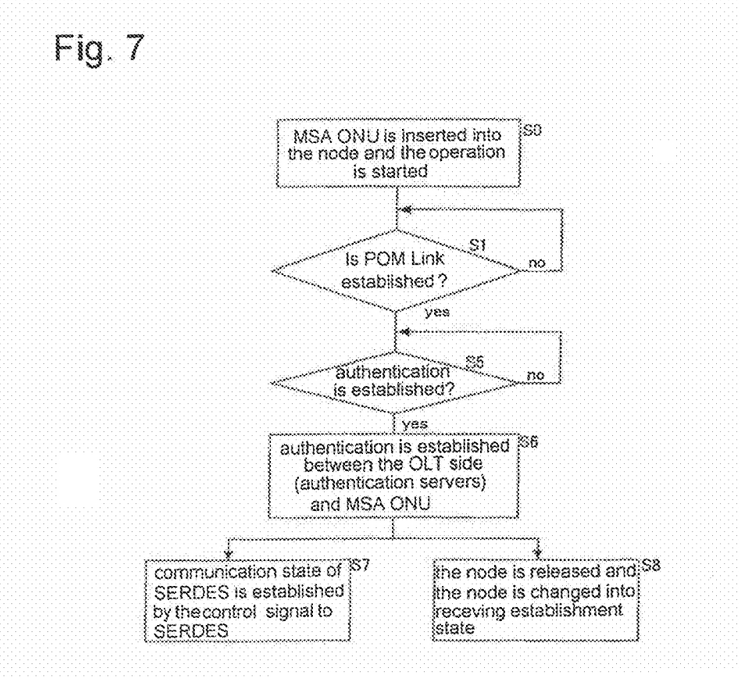
FIG. 7 is a flow diagram showing a communication state on the ONU for establishing an authentication with a central office in the optical transmission system regarding the embodiment of the present invention.

Here, when the MSA interface module 9 of the MSA ONU 5, which is optically connected with the OLT 1*a*, is inserted into the node 20, an operation of the MSA ONU 5 is started (an S0 in FIG. 7). Moreover, when the PON link is established in order (an S1 in FIG. 7), in the authentication function part 1*b*, authentication processing is started for identifying the ONU 5 thereafter (an S5 in FIG. 7). And then via the OLT 1*a*, when the authentication is established between the authentication function part 1*b* and the MSA ONU 5, it becomes to be an authentication established state (an S6 in FIG. 7).

Regarding the LSI device 10 in the ONU function part 7, which is become as the authentication established state, the GPIO signal 30 is changed from (1) to (0), and then it is output to the serial/parallel transform unit 8 and the MSA interface module 9.

Thus, in the LSI device 10, the PON link becomes to be established as a state. Moreover, the GPIO signal 30 of (0) is output to the loop back setting part 8L in the serial/parallel transform unit 8 therefrom, and then the loop back is released. Furthermore, a communication state mutual between the MSA interface module 9 and the LSI device 10 becomes to be established therein (an S7 in FIG. 7).

Moreover, regarding the LSI device 10 as the PON link being established, the RX-LOSS signal 31*b* of (0) meaning a normal state is transmitted to the node 20, via the MSA interface module 9 and the MSA interface slot 20*a*. Hence, a notice of a loss state for the node 20 is released, and then the node 20 is changed into a receiving establishment state (an S8 in FIG. 7).

Thus, via the MSA ONU 5, between the OLT 1*a* and the node 20, the data, such as the PHY, L2, L3, or the like, becomes to be transmitted in order as a state.

According to the above mentioned MSA ONU 5, the TBI output of the LSI device 10 for ONU is to be used for the transmission state of signals by fibers. Therefore, such as the PHY, the transformer, 1000 BASE-T, and the connector of the 1000 BASE-T are not necessary to be used. Hence, a circuit scale becomes able to be reduced, and then an installation space becomes able to be reduced.

Moreover, the MSA interface module 9 of the MSA ONU 5 is to be inserted into the slot 20s on the MSA interface slot 20a. Hence, a connection between the ONU function part 7 and the switch core unit 20c becomes possible. Thus, between the MSA ONU 5 and the node 20, time of such as wiring cables, connecting therebetween, and the like, becomes to be unnecessary.

Furthermore, a power necessary for operating the MSA ONU 5 is supplied from the MSA interface slot 20a in the node 20, via the MSA interface module 9. Hence, a power supply unit and power wiring therefrom, at outside the ONU, become to be unnecessary. Thus, connecting work of a power cable with a power receptacle, and a required space therefor, become able to be omitted. Moreover, a reliability of the whole system configuration becomes able to be improved.

Thus, in the above description, as the interface or the interface module for connecting the ONU 5 with the external node 20, the MSA interface of such as the GBIC and the SFP are described as embodiments. However, it is not limited thereto; an interface or an interface module may be used as well, of which shape, an interface signal, and the like, are original. For one example, the node 20 shown in FIG. 1 is a base station or the like comprising the original interface. Moreover, the MSA ONU 5 connected therewith also comprises the original interface, which is possible to be connected with the interface of the node 20, as a case to be considered.

As above described, even in the case of using original interfaces or interface modules other than the MSA interface, the functions and the advantages of the present invention described in the above embodiments are able to be obtained as well.

The present invention is not limited to the above described embodiments and various and modifications may be possible without departing from the scope of the present invention.

What is claimed is:

1. A customer premises optical network unit (ONU) comprising:
   an electrical/optical transform unit to be connected with an optical transmission path at a central office side for performing an opto-electrical transform and an inverse opto-electrical transform;
   an ONU function part to be connected with an electric signal input and output terminal of the electrical/optical transform unit;
   a serial/parallel transform unit to be connected with a parallel signal terminal of the ONU function part for performing a serial/parallel transform and an inverse serial/parallel transform; and
   a multi source agreement (MSA) interface module to be connected with a serial signal terminal of the serial/parallel transform unit, wherein
   the ONU function part comprises a signal terminal configured to output a received establishment signal to an external node to be connected with the MSA interface module, triggered by a signal output when a passive optical network (PON) link with the central office side is established, or when authentication with the central office side is established.

2. The customer premises ONU of claim 1,
   wherein the MSA interface module is any one module of a giga bit interface converter (GBIC) and a small form factor pluggable (SFP).

3. The customer premises ONU of claim 1,
   wherein the parallel signal comprises 10 bits for both of an input signal and an output signal.

4. The customer premises ONU of claim 1,
   wherein the signal terminal of the ONU function part is configured to output a control signal for establishing a communication state between the serial/parallel transform unit and the MSA interface module, to the serial/parallel transform unit, triggered by the signal output when a PON link with the central office side is established, or when an authentication with the central office side is established.

5. The customer premises ONU of claim 4,
   wherein the serial/parallel transform unit comprises a loop back setting part configured to form a loop back state for looping back a signal from the central office side at the period of an initial state before the communication state being established, and release the loop back state after the communication state is established, triggered by the control signal output from the signal terminal of the ONU function part.

6. The customer premises ONU of claim 1,
   wherein the signal terminal of the ONU function part is configured to be connected with a time adjustment circuit.

7. An optical transmission system comprising:
   said customer premises ONU of claim 1;
   an optical multiplexing and de-multiplexing part comprising a customer premises port configured to be connected with the customer premises ONU via a first optical transmission path;
   a second optical transmission path configured to be connected with a central office side port of the optical multiplexing and de-multiplexing part; and
   an OLT (Optical Line Terminal) at the central office side configured to be connected with the second optical transmission path.

8. The optical transmission system of claim 7,
   wherein the MSA interface module of the customer premises ONU is configured to be connected directly with an MSA interface slot of a node arranged externally therefrom.

9. The optical transmission system of claim 8,
   wherein the node is a LAN (Local Area Network) switch comprising a plurality of ports.

10. A customer premises optical network unit (ONU) comprising:
    an electrical/optical transform unit configured to be connected with an optical transmission path at a central office side for performing an opto-electrical transform and an inverse opto-electrical transform;
    an ONU function part configured to be connected with an electric signal input and output terminal of the electrical/optical transform unit;
    a serial/parallel transform unit configured to be connected with a parallel signal terminal of the ONU function part for performing a serial/parallel transform and an inverse serial/parallel transform;
    an interface module configured to be connected with a serial signal terminal of the serial/parallel transform unit, wherein
    said ONU function part comprises a signal terminal configured to output a received establishment signal to an external node to be connected with the interface module, triggered by a signal output when a passive optical network (PON) link with the central office side is established, or when an authentication with the central office side is established.

11. The customer premises ONU of claim 10,
wherein the ONU function part comprises a signal terminal configured to output a control signal for establishing a communication state between the serial/parallel transform unit and the interface module, to the serial/parallel transform unit, triggered by a signal output when a PON link with the central office side is established, or when an authentication with the central office side is established.

12. The customer premises ONU of claim 11,
wherein the serial/parallel transform unit comprises a loop back setting part, configured to form a loop back state for looping back a signal from the central office side at the period of an initial state before the communication state is established, and which releases the loop back state after the communication state is established, triggered by the control signal output from the signal terminal of the ONU function part.

13. The customer premises ONU of claim 10,
wherein the parallel signal comprises 10 bits for both of an input signal and an output signal.

14. The customer premises ONU of claim 10,
wherein the signal terminal of the ONU function part is configured to be connected with a time adjustment circuit.

15. An optical transmission system comprising:
said customer premises optical network unit (ONU) of claim 10;
an optical multiplexing and de-multiplexing part comprising a customer premises port configured to be connected with the customer premises ONU via a first optical transmission path;
a second optical transmission path configured to be connected with a central office side port on the optical multiplexing and de-multiplexing part; and
an OLT (Optical Line Terminal) at the central office side configured to be connected with the second optical transmission path.

16. The optical transmission system of claim 15,
wherein the interface module of the customer premises ONU is configured to be connected directly with an interface slot on a node arranged externally therefrom.

17. The optical transmission system of claim 16,
wherein the node is a LAN (Local Area Network) switch comprising a plurality of ports.

* * * * *